United States Patent [19]

Baer

[11] Patent Number: 4,496,158
[45] Date of Patent: Jan. 29, 1985

[54] ELECTRO-OPTICAL SENSOR FOR COLOR TELEVISION GAMES AND TRAINING SYSTEMS

[75] Inventor: Ralph H. Baer, Manchester, N.H.

[73] Assignee: Sanders Associates, Inc., Nashua, N.H.

[21] Appl. No.: 449,069

[22] Filed: Dec. 13, 1982

[51] Int. Cl.³ .............................................. A63F 9/22
[52] U.S. Cl. .................................... 273/312; 273/314;
273/DIG. 28; 273/1 E; 340/702; 340/707; 434/22
[58] Field of Search .............................. 273/312–316, 273/1 E, DIG. 28, 310; 358/60; 340/701–704, 707; 434/20–22; 235/465, 469

[56] References Cited

U.S. PATENT DOCUMENTS

| | | | |
|---|---|---|---|
| 3,376,465 | 4/1968 | Corpew | 340/701 |
| 3,443,072 | 5/1969 | Mori | 235/465 |
| 3,775,005 | 11/1973 | Szabo | 340/707 |
| 3,798,363 | 3/1974 | Melchior | 340/707 |
| 4,223,454 | 9/1980 | Mohon et al. | 434/22 |
| 4,243,972 | 1/1981 | Toussaint | 340/707 |
| 4,328,493 | 5/1982 | Shanks et al. | 340/703 |
| 4,349,337 | 9/1982 | Pardes | 273/310 |

Primary Examiner—Richard C. Pinkham
Assistant Examiner—MaryAnn Lastova
Attorney, Agent, or Firm—Louis Etlinger; Richard I. Seligman

[57] ABSTRACT

Apparatus for discriminating at a distance between one or more colored symbols displayed on the screen of a television receiver from a plurality of other symbols of different colors includes a colored filter which corresponds to the color of the symbol which is to be discriminated.

6 Claims, 1 Drawing Figure

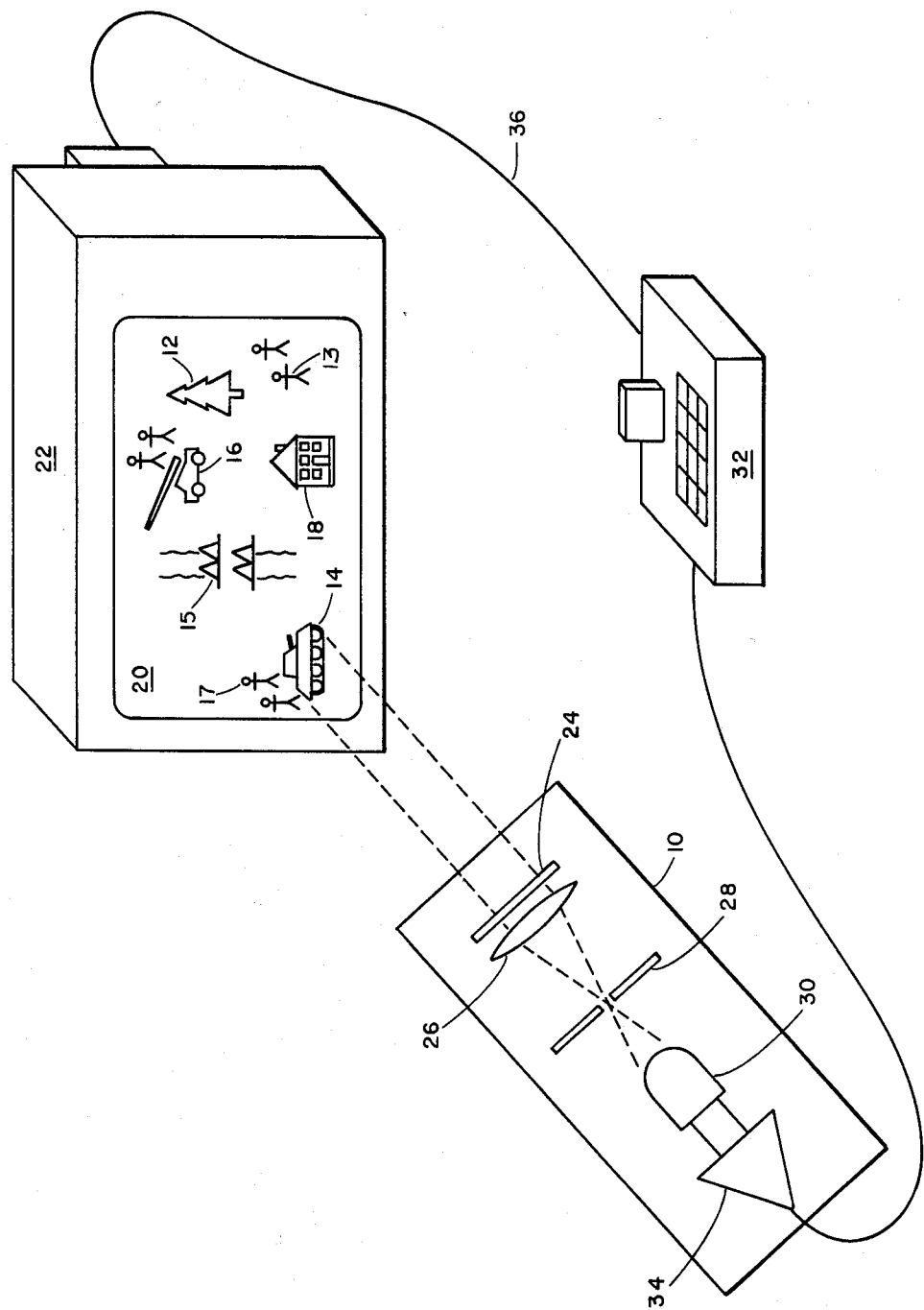

ELECTRO-OPTICAL SENSOR FOR COLOR TELEVISION GAMES AND TRAINING SYSTEMS

BACKGROUND OF THE INVENTION

This invention relates to television games and training systems and, more particularly, to such games and training systems which employ electro-optical sensors. Television games providing photosensitive devices capable of sensing large, bright target symbols on the screen of a television receiver are well known and disclosed in U.S. Pat. Nos. 3,728,480; 3,829,095; and RE 28,598, all assigned to the assignee of the present application.

All of these patents refer in part to target shooting games which provide for the display of a distinct target spot on the screen of a television receiver which, when imaged on a gun-mounted, electro-optical sensor, results in a series of output pulses indicating that the gun was indeed lined up properly with the target and therefore, a "hit" had been scored.

Numerous light sensitive rifle and pistol shooting game units based on the referenced patents have been produced during the past number of years. These television game accessories have provided game players with an interesting way of interacting with the screen of the television receiver. To date, these shooting systems have, in general, been applied only to relatively simple television games in which very few symbols appear simultaneously on the television receiver screen. Thus, there was no problem in discerning whether a target spot had been hit or was missed.

Present day television games frequently involve a larger number of both static and moving symbology simultaneously present on the screen of the television receiver. As a result, simple, earlier methods of identifying a "hit" of a target spot will not work adequately since there are many spots on the screen at one time and one is not apprised of which of the many spots was aligned with the electro-optical sensor when it sensed light therefrom.

Accordingly, it is an object of the present invention to provide improved means of electro-optically sensing displayed images on a television screen.

It is another object of this invention to permit detecting from a distance a particular spot on a television screen and to acknowledge that, in fact, the particular spot was detected rather than one of the many other symbols which may be displayed at the same time.

SUMMARY OF THE INVENTION

Briefly, this invention addresses a television game or training system in which it is desired to "shoot" at or otherwise interact optically at a distance from the television receiver screen with one of a multiplicity of symbols simultaneously present on the screen. In such a game or training system, when optically detecting a particular symbol aligned with the optical axis of the photosensor system, an output is obtained provided the light source is bright enough and further provided that the sensor and amplifier following it have adequate sensitivity and gain to overcome the threshold built into the circuitry to avoid spurious outputs due to noise.

The present invention adds to the foregoing system a low cost, optical color filter positioned in the optical path of the photosensor assembly. Designated target symbols on the television receiver screen have been presented predominantly in a color or colors close to that of the filter such that the ultimate objective is to register "hits" only on such designated targets and discriminate against all other symbols which may be present on the screen at the same time.

BRIEF DESCRIPTION OF THE DRAWING

The above-mentioned and other features and objects of this invention will become more apparent by reference to the following description taken in conjunction with the accompanying drawing which is a block diagram representation of the elements of a television game system employing an electro-optical sensor in conjunction with an optical color filter.

DESCRIPTION OF A PREFERRED EMBODIMENT

Referring now to the drawing, there is illustrated thereby an embodiment of the invention for discriminating between many symbols displayed on a color television receiver screen with a photosensitive detector. The invention employs an electro-optical system 10 which is used to detect one of a multiplicity of symbols 12–18 which have displayed on the screen 20 of a television receiver 22. When a user is at a distance from the television receiver 22 and attempts to detect only one of the symbols 14 out of the multiplicity of symbols displayed on the screen using a photosensitive detection system, it is not possible, with conventional systems, to determine which of the symbols 12 through 18 was, in fact, detected. The user can determine that one of the symbols 12 through 18 was aligned with the optical axis of the electro-optical sensing system and received light therefrom. In accordance with the principles of the present invention, discrimination between the symbols 12 through 18 may be obtained such that the electro-optical system 10 will only respond to light from symbol 14.

In this embodiment the electro-optical system 10 includes a color filter 24 through which any light from the television screen must pass. The light passing the color filter 24 is received at a converging lens 26 where it is converged on the pinhole of a field stop 28. From the field stop 28 the beam is sent out and is intercepted by the surface of a photosensitive detector 30. The photosensitive detector is positioned relative to the field stop 28 at a point at which the expanding beam from the field stop 28 approximates the surface area of the sensor element for maximum energy transfer. The output from photosensitive detector 30 is applied to a conventional game console 32 via an amplifier 34. Game console 32 is connected via a line 36 to a television receiver 22 in conventional fashion. If the optics of the electro-optical system 10 are properly lined up by the human player, using whatever aiming means may be provided, then a large output appears from the output of amplifier 34 where it enters games console 32 and "informs" the game console of the presence of a "hit".

This kind of electro-optical system may be used in many various applications. In conventional shooting games the electro-optical system may be disposed within the barrel of a toy gun. For other kinds of games the electro-optical system 10 may be disposed in, for example, a simulated camera where one object of the game may be to "photograph" some symbol on the screen of the television receiver 22. For example, certain games may evolve wherein clues are presented on a television receiver and it is the object for the "detective" to "photograph" the symbol clue which will aid in winning the game. Other games which can employ this invention can be certain sophisticated military games wherein guided missiles are used and the photosensitive element is "contained" within the guided missile to detect targets displayed on a television screen. The invention also has applicability to training systems for training personnel which are required to sense a particular object in a field of many objects such as military training.

Discrimination between, and selection from, a number of simultaneously present color symbols on the screen of a television receiver used for television games and training systems depends on obtaining significantly large sensor outputs in one relatively restricted color range versus the output obtained for all other colors used in the display.

It is well known that silicon photo transistors and diodes have their peak response in the near infrared region, that is, roughly 0.85 microns. It is also known that for a given chroma signal level and given brightness or contrast control settings, a typical television screen produces luminous outputs in its three primary colors that are quite different from one another, blue providing the highest output and red providing the lowest.

With these facts available, tests were made to explore the relative response of silicon photosensors to symbols of various saturated hues delivered by a digital television game apparatus which was connected to a conventional television receiver. The following table summarizes some of the results.

| Color | Response Without Filter | Response With Blue Filter |
| --- | --- | --- |
| Light Blue | 100% | 100% |
| Violet | 78% | 81% |
| Medium Blue | 75% | 75% |
| Dark Blue | 71% | 62% |
| Aqua | 50% | 19% |
| White | 50% | 31% |
| Pink | 46% | 31% |
| Orange | 39% | 0% |
| Green | 36% | 6% |
| Yellow | 32% | 0% |
| Magenta | 14% | 0% |
| Gray | 7-18% | 0% |
| Brown | 11% | 0% |

Reference to this table clearly shows that a low-cost, blue filter results in large ratios of output signals between blue related and other colors; hence, its use leads to practical embodiments of the present invention. These results are unexpected, since the high red sensitivity of silicon photodetection suggests that a red filter would be the proper choice.

Using a blue plastic transparency as a filter, a typical space adventure television game having, for example, a yellow background, green ground features, and orange "attacking invader" symbols will produce no output from the electro-optical sensing system 10 if it responds in accordance with the table; however, if the "invaders" drop blue missiles, these can readily be detected by the system using a photosensor and blue filter as described above.

Thus, it is entirely practical to "see" only those symbols of a complex game display which are appropriately color coded by the governing program. One interesting aspect of these tests of color filters is that using a blue filter works very reliably with a range of blue-related colors which is not an obvious result when it is considered that the well-known spectral response curve for silicon devices peaks beyond the red end of the visible spectrum, thus, suggesting that red would probably be a preferred color for most applications.

Discovery that the response curve of silicon photosensors and illuminous efficiency of color cathode ray tube phosphors offset each other makes the use of a low-cost filter practical. Thus, not only can a blue filter be used, but an optical filter in the red/orange area of the visible spectrum gives similar useful results as those tabulated above albeit with smaller output voltage ratios between desired and undesired color symbols.

Preferably, as mentioned above, the filters are simple, low-cost filters such as plastic transparencies since, particularly for television game apparatus, it is necessary that the components thereof be relatively inexpensive and an optical narrow band filter of, for example, the deposited-film type would be prohibitively expensive for many applications.

While the present invention has been described in the main in conjunction with television games and also references training systems, the principles of the invention are applicable to any situation where it is necessary to detect one from many of colored symbols simultaneously present on the screen of a television receiver, television monitor, other color display, and where the sensing means must be displayed at a distance from the screen such that such discrimination can not be merely made by bringing the electro-optical sensor right up to the screen and touching the symbol to be detected. Thus, it is to be understood that the embodiment shown is to be considered illustrative only and that many variations and modifications may be made without departing from the principles of the invention herein disclosed and defined by the appended claims.

I claim:

1. Apparatus for sensing at a distance one or more colored symbols shown on a display from among at least one other symbol of a different color, comprising:
an electro-optical sensor disposed at a distance from a display and capable of receiving light rays from symbols representing objects shown on the display;
said electro-optical sensor including a photosensitive detector and only a single color filter associated therewith to limit the reception of light detected by the photosensitive detector to light from displayed symbols of predetermined colors while light from displayed symbols of other colors is not detected by the photosensitive detector, said color filter comprising an optical filter including a material which passes visible radiation of certain predetermined wavelengths and excludes visible radiation of certain other wavelengths, wherein the beam of light entering said single color filter has not been split by a beam splitter.

2. The apparatus of claim 1, wherein said filter is an optical filter transparency.

3. The apparatus of claim 2, wherein said optical filter transparency has a color transmissivity response which peaks near the color of the symbol to be detected.

4. The apparatus of claim 3, wherein said display in a color television cathode ray tube and said optical filter transparency is blue.

5. The apparatus of claim 3, wherein said display is a color television cathode ray tube and the color of said optical filter transparency is in the red/orange area of the visible spectrum.

6. The apparatus of claim 1, wherein said electrooptical sensor further includes a lens and field stop disposed between said color filter and said photosensitive detector.

* * * * *